United States Patent
Lyons et al.

(10) Patent No.: US 8,360,875 B2
(45) Date of Patent: Jan. 29, 2013

(54) JACKPOT DISPLAY SYSTEM

(75) Inventors: Martin Stephen Lyons, Lane Cove (AU); Robert Linley Muir, Lane Cove (AU)

(73) Assignee: Aristocrat Technologies Australia Pty Limited (AU)

( * ) Notice: Subject to any disclaimer, the term of this patent is extended or adjusted under 35 U.S.C. 154(b) by 1038 days.

(21) Appl. No.: 12/134,115

(22) Filed: Jun. 5, 2008

(65) Prior Publication Data

US 2009/0124336 A1 May 14, 2009

(30) Foreign Application Priority Data

Jun. 7, 2007 (AU) ................................. 2007903079

(51) Int. Cl.
*A63F 9/24* (2006.01)
(52) U.S. Cl. ............... 463/30; 463/31; 463/16; 463/26
(58) Field of Classification Search ............... 463/26, 463/30, 31, 46; 715/781
See application file for complete search history.

(56) References Cited

U.S. PATENT DOCUMENTS

| | | | |
|---|---|---|---|
| 6,015,347 A | 1/2000 | Maahs et al. | |
| 6,636,648 B2 * | 10/2003 | Loui et al. | 382/284 |
| 2003/0220139 A1 * | 11/2003 | Peterson | 463/30 |
| 2005/0003880 A1 * | 1/2005 | Englman et al. | 463/16 |
| 2006/0003829 A1 | 1/2006 | Thomas | |
| 2006/0035706 A1 | 2/2006 | Thomas et al. | |
| 2007/0060314 A1 | 3/2007 | Baerlocher et al. | |
| 2007/0281784 A1 * | 12/2007 | Seelig et al. | 463/26 |
| 2008/0039174 A1 * | 2/2008 | Litman | 463/20 |
| 2008/0076540 A1 * | 3/2008 | Aida | 463/26 |
| 2008/0189752 A1 * | 8/2008 | Moradi et al. | 725/105 |
| 2008/0228544 A1 * | 9/2008 | Woosley et al. | 705/8 |
| 2012/0202582 A1 * | 8/2012 | Hill et al. | 463/20 |

FOREIGN PATENT DOCUMENTS

| | | |
|---|---|---|
| CA | 2514156 | 1/2007 |
| CA | 2559412 | 3/2007 |
| JP | 2006333895 | 12/2006 |
| JP | 2006346024 | 12/2006 |
| JP | 2006346026 | 12/2006 |
| JP | 2007006991 | 1/2007 |

* cited by examiner

*Primary Examiner* — Dmitry Suhol
*Assistant Examiner* — Carl V Larsen
(74) *Attorney, Agent, or Firm* — McAndrews, Held & Malloy, Ltd.

(57) ABSTRACT

A jackpot display system (10) for a gaming system, the jackpot display system comprising a display control device (14) arranged to receive jackpot data indicative of a plurality of current jackpot amounts, each jackpot amount being derived from games played on at least one gaming machine (40, 42), and a plurality of displays (16) in communication with the display control device (14). The display control device (14) is arranged to selectively associate at least some of the displays (16) with respective jackpot amounts so that during use jackpot amounts are shown on the associated displays.

39 Claims, 6 Drawing Sheets

JACKPOT DISPLAY SYSTEM

RELATED APPLICATIONS

This application claims priority to Australian Provisional Patent Application No. 2007903079, having an international filing date of Jun. 7, 2007, entitled "A Jackpot Display System," which is hereby incorporated by reference herein in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present invention relates to a jackpot display system. It is known to provide a gaming system which includes a plurality of gaming machines connected together and configured such that each gaming machine contributes to a common jackpot which may be won by players of the gaming machines. In general, each common jackpot is managed by a jackpot controller which receives jackpot contribution data from each gaming machine associated with the common jackpot, and outputs a jackpot amount derived from the jackpot contribution data to a display. The purpose of the display is to advertise the common jackpot to players and thereby encourage the players to play a game on the gaming machines associated with the common jackpot.

However, such jackpot display systems are relatively unsophisticated and inflexible.

BRIEF SUMMARY OF THE INVENTION

In accordance with a first aspect of the present invention, there is provided a jackpot display system for a gaming system, the jackpot display system comprising:
   a display control device arranged to receive jackpot data indicative of a plurality of current jackpot amounts, each jackpot amount being derived from games played on at least one gaming machine; and
   a plurality of displays in communication with the display control device;
   wherein the display control device is arranged to selectively associate at least some of the displays with respective jackpot amounts so that during use the jackpot amounts are shown on the associated displays.

In one arrangement, the display control device is arranged to associate at least some of the displays with jackpot amounts so that a plurality of jackpot amounts are simultaneously displayed on a plurality of displays.

In one arrangement, the control device is arranged to associate at least some of the displays with jackpot amounts so that a plurality of jackpot amounts are consecutively displayed on at least one of the displays. The consecutively displayed jackpot amounts may be displayed in a predetermined order, for example from highest to lowest jackpot amount, or pseudo randomly.

In one arrangement, the control device is arranged to associate at least some of the displays with jackpot amounts so that at least one displayed jackpot amount is emphasised relative to the other displayed jackpot amounts. In one arrangement, the control device is arranged to emphasise a displayed jackpot amount when the jackpot amount has been won by a player of a gaming machine. With this arrangement, only the jackpot amount which has been won may be displayed on the displays or the jackpot amount which has been won may be displayed at an increased size relative to other displayed jackpot amounts.

In one arrangement, the display control device comprises a display controller arranged to receive jackpot data indicative of a plurality of jackpots, and to generate display data usable by the displays to display at least one jackpot amount.

The control device may comprise a master display controller and a plurality of slave display controllers under control of the master display controller.

In one embodiment, the display control device comprises a multiplexer arranged to selectively connect each of at least some of the displays to information indicative of a jackpot amount.

In one arrangement, each jackpot amount has an associated display controller arranged to generate display data usable by a display to display a jackpot amount. The multiplexer may be arranged to selectively direct display data from the display controllers to the displays. In an alternative arrangement, the multiplexer is arranged to selectively direct jackpot data to the display controllers.

The jackpot display system may be arranged to apply video effects to the displayed jackpot amounts, such as scaling, rotating and fading in/out as the displayed jackpot amounts change.

The jackpot display system may further comprise at least one jackpot controller, each jackpot controller being arranged to receive jackpot contribution data from a plurality of gaming machines associated with the jackpot controller, and each jackpot controller being arranged to generate jackpot data indicative of a jackpot amount for supply to the display control device.

In one embodiment, the jackpot display system is arranged to receive video data for selective display on at least one of the displays at the same time as or intermittently with the jackpot amounts. The video data may correspond to any video information such as advertising information or sporting events.

The jackpot display system may be arranged to store multiple sets of video data for each jackpot amount to be displayed, each set of video data being optimised to a particular display size, and the jackpot display system being arranged to select one of the video data sets depending on the size at which the jackpot amount is to be displayed.

In accordance with a second aspect of the present invention, there is provided a method of displaying a jackpot, the method comprising:
   receiving jackpot data indicative of a plurality of current jackpot amounts, each jackpot amount being derived from games played on at least one gaming machine; and
   providing a plurality of displays in communication with the display control device; and
   selectively associating at least some of the displays with respective jackpot amounts so that during use jackpot amounts are shown on the associated displays.

BRIEF DESCRIPTION OF SEVERAL VIEWS OF THE DRAWINGS

The present invention will now be described, by way of example only, with reference to the accompanying drawings, in which.

DETAILED DESCRIPTION OF THE INVENTION

Figure 1:
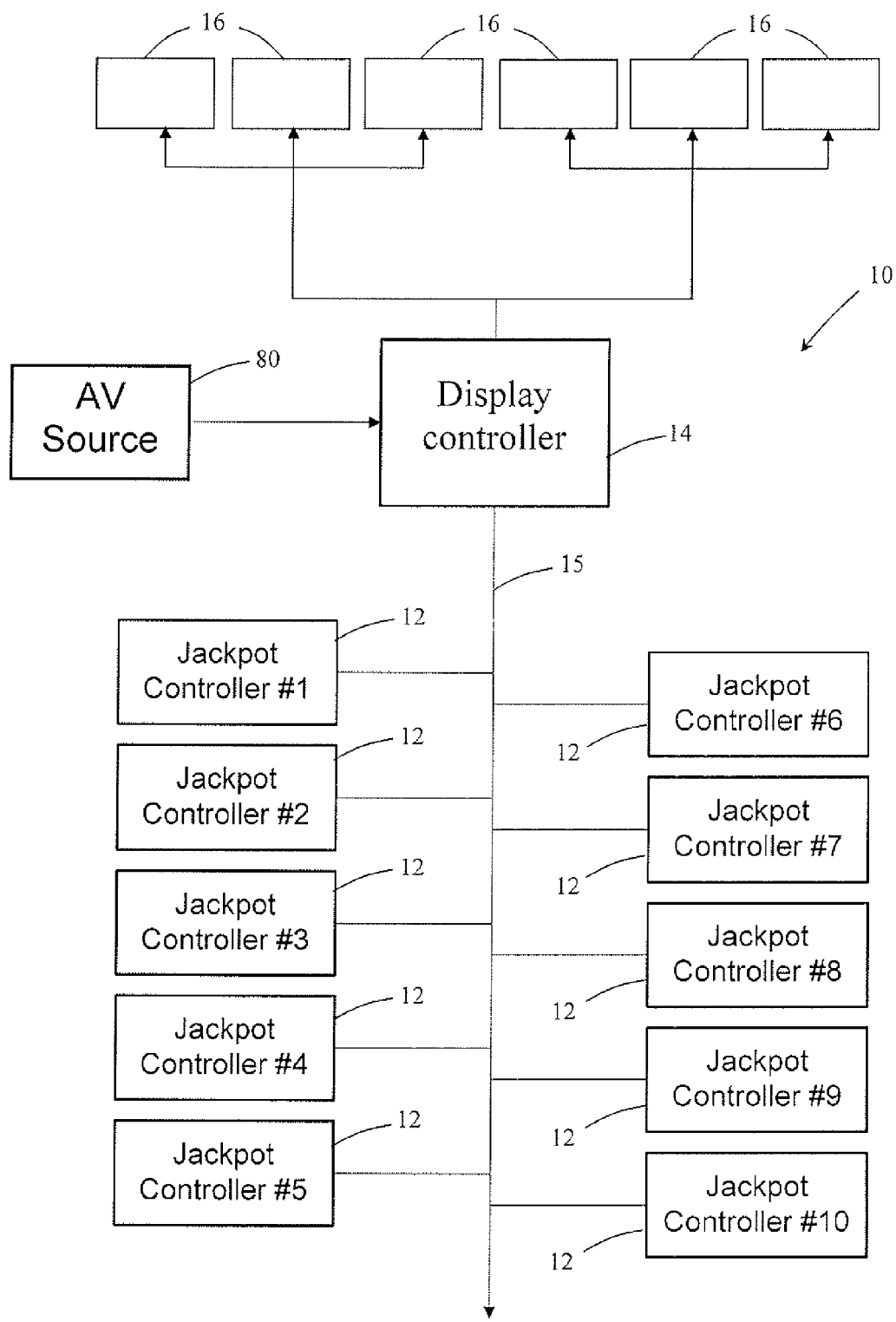
FIG. 1 is a schematic block diagram of a jackpot display system in accordance with an embodiment of the present invention.

Referring to the drawings, in FIG. 1 there is shown a jackpot display system 10 for use with a gaming system of the type including a plurality of gaming machines.

The jackpot display system 10 comprises a plurality of jackpot controllers 12, each of which is associated with one or more gaming machines such that the associated gaming machines contribute to a common jackpot managed by the jackpot controller 12.

The jackpot display system 10 also comprises a display control device 14, in this example in the form of a display control device 14, which is connected to the jackpot controllers 12 through a jackpot network 15. The display control device 14 is arranged to receive jackpot data indicative of respective jackpot amounts from the jackpot controllers 12 and to control a plurality of displays 16 so that at least some of the displays 16 receive video information indicative of a jackpot amount associated with a jackpot controller 12.

In particular, the display controller 14 may be arranged to generate display data and to control the displays 16 so as to simultaneously show multiple jackpot amounts, with each display showing one jackpot amount; to emphasize one or more of the jackpot amounts, for example when one of the jackpots is won by a player, by displaying the winning jackpot amount on all of the displays 16 or by increasing the size of the winning jackpot amount relative to the other jackpot amounts; to sequentially show all jackpot amounts on each display for example in order of highest to lowest jackpot amount, and so on.

Figure 2:
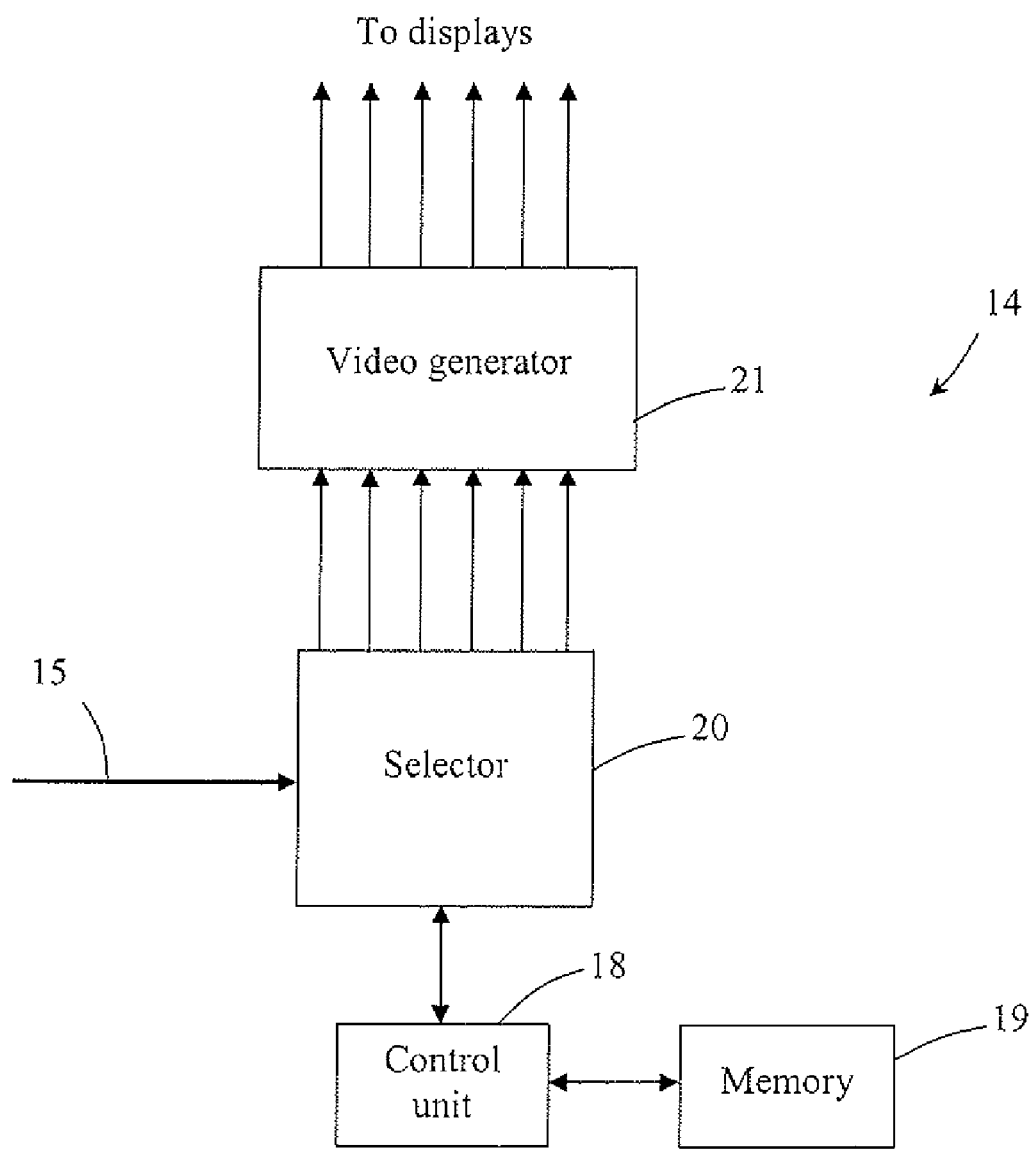
FIG. 2 is a schematic block diagram of a display control device of the jackpot display system shown in FIG. 1.

For this purpose, as shown in FIG. 2 the display control device 14 may include a control unit 18 which may comprise a processor, a memory 19 usable to store programs for execution by the processor, a selector 20 under control of the control unit 18 to select jackpot data from the jackpot network 15 and associate the selected jackpot data with one or more displays, and a video generator 21 arranged to generate display data usable by the displays to display the selected jackpot amounts.

If the number of jackpot amounts exceeds the number of displays 16, the display controller 14 may also be arranged so as to selectively modify the jackpot amounts displayed, for example so as to randomly display the jackpot amounts, or so as to display only the highest value jackpot amounts.

If the number of displays exceeds the number of jackpot amounts, the display controller 14 may be arranged so as to display a selected jackpot amount on more than one display, for example the highest jackpot amount may be displayed on more than one display.

The display controller 14 may also apply video effects such as scaling, rotating and fading in/out as the displayed images change.

It will be understood that the display scheme implemented by the display controller 14, in particular which jackpot amounts are displayed and the manner in which the jackpot amounts are displayed, may be selectable by a user, for example using a computing device (not shown) in communication with the display controller 14, may be implemented automatically by the processor 18 in accordance with the programs stored in the memory 20, or in any other suitable way.

Figure 3:
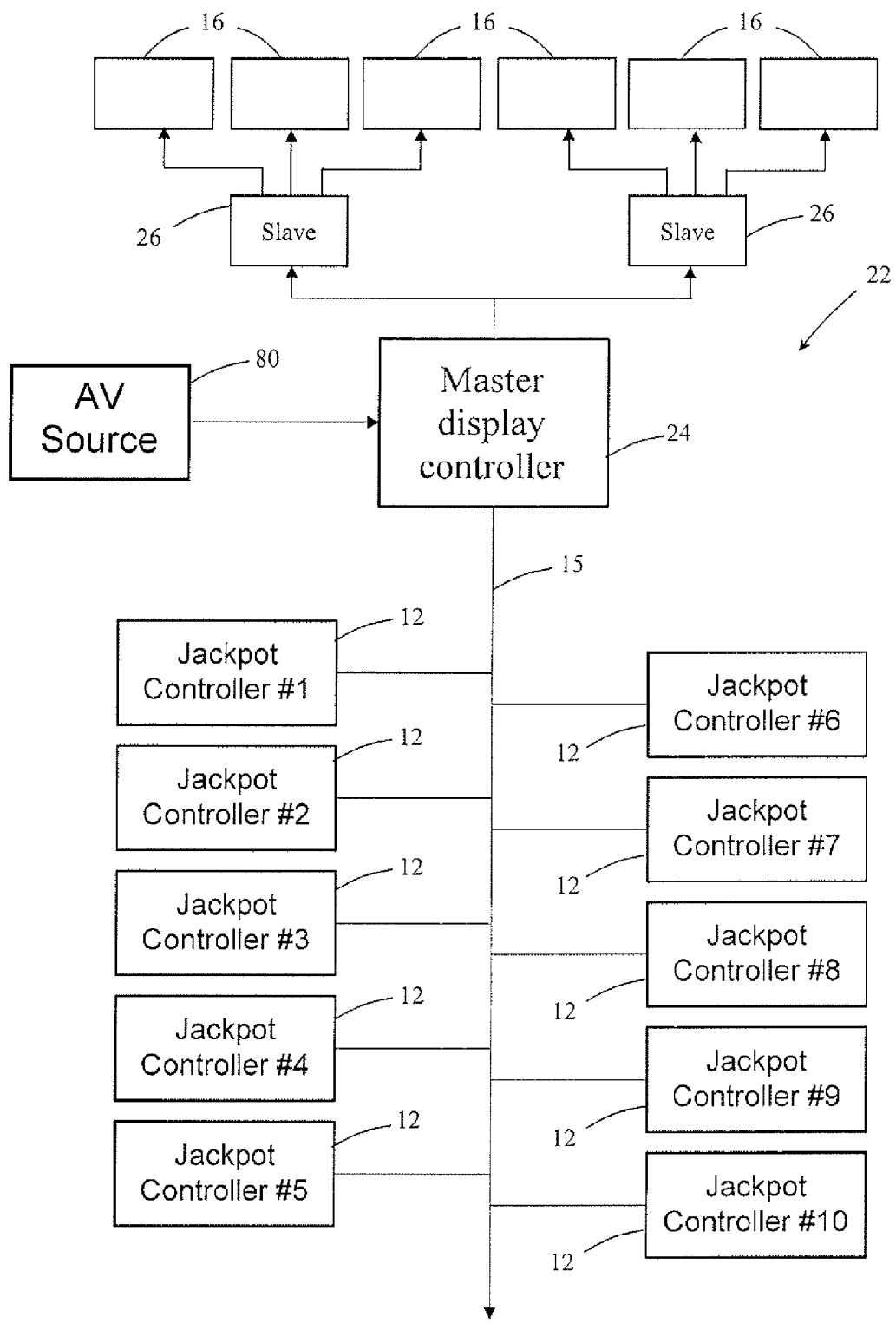
FIG. 3 is a schematic block diagram of a jackpot display system in accordance with an alternative embodiment of the present invention.

In FIG. 3, an alternative jackpot display system 22 is shown for use with a gaming system of the type including a plurality of gaming machines. Like and similar features are indicated with like reference numerals.

As with the embodiment shown in FIG. 1, the jackpot display system 22 comprises a plurality of jackpot controllers 12, each of which is associated with one or more gaming machines. However, with this embodiment a master display controller 24 and several slave display controllers 26 are provided to control the plurality of displays 16. This configuration may be used in order to increase performance if insufficient performance is obtained using a single display controller as shown in FIG. 1.

The master display controller 24 is arranged to monitor all jackpot amounts supplied by the jackpot controllers 12 and to instruct the slave display controllers 26 to drive the displays so that particular jackpots are shown on selected displays 16. The master display controller 24 may also be arranged to generate and supply time synchronization information to the slave display controllers 26 so as to enable jackpot amounts to be synchronously displayed.

The master controller 24 may also incorporate slave controller functionality, and each slave controller 26 may incorporate master controller functionality so that the master and slave controllers 24, 26 are interchangeable. This may be useful if the master controller 24 fails, as one of the slave controllers 26 may be used as a master controller 24 until a replacement master controller can be obtained.

It will be appreciated that each of the jackpot display systems 10, 22 shown in FIGS. 1 and 3 is arranged such that jackpot data from several jackpot controllers 12 is supplied to a display control device 14, 24, 26 and the control device generates display data usable by the displays 16 to display jackpot amounts associated with selected jackpot data, the display control device selectively associating a display 16 with a jackpot controller 12 so that the jackpot amount managed by the jackpot controller is shown on the display 16. In other words, the display control device generates and selectively directs display data associated with the jackpot amounts to the displays.

Figure 4:
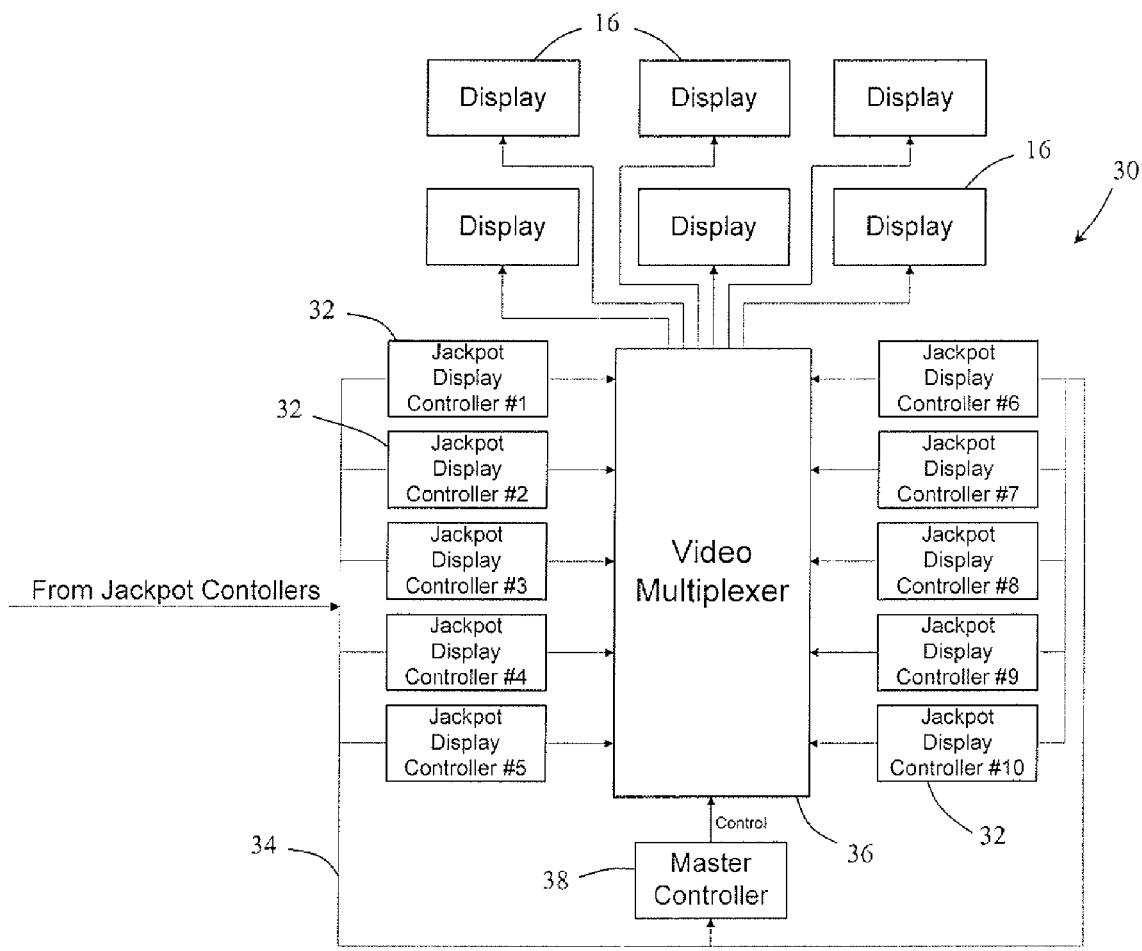
FIG. 4 is a schematic block diagram of a jackpot display system in accordance with a further alternative embodiment of the present invention.

In FIG. 4 there is shown a further alternative jackpot display system 30 for use with a gaming system of the type including a plurality of gaming machines. Like and similar features are indicated with like reference numerals.

As with the jackpot display systems 10, 22 shown in FIGS. 1 and 3, the jackpot display system 30 comprises a plurality of jackpot controllers (not shown). However, with this embodiment, each of the jackpot controllers supplies a dedicated jackpot display controller 32 with jackpot data through a jackpot network 34, and each display controller 32 generates display data corresponding to the received jackpot data.

The jackpot display controllers 32 are connected to a video multiplexer 36 controlled by a master controller 38. Under control of the master controller 38, the video multiplexer 36 directs video information from selected jackpot display controllers 32 to one or more of the displays 16 so that each display 16 shows a jackpot amount associated with one of the display controllers 32. An advantage of this implementation is that jackpot display controllers from different manufacturers may be incorporated into the jackpot display system 30.

In an alternative of the embodiment shown in FIG. 4, instead of providing a video multiplexer 36 which receives video information from a plurality of jackpot display controllers 32, a multiplexer capable of selectively directing jackpot data from the jackpot controllers to dedicated display controllers 32 may be provided. In other words, instead of providing a multiplexer between display controllers 32 and the displays 16, a multiplexer may be disposed between the jackpot controllers 12 and the display controllers 32.

It will be understood that existing display systems may be implemented in parallel with the jackpot display systems 10, 22.

Figure 5:
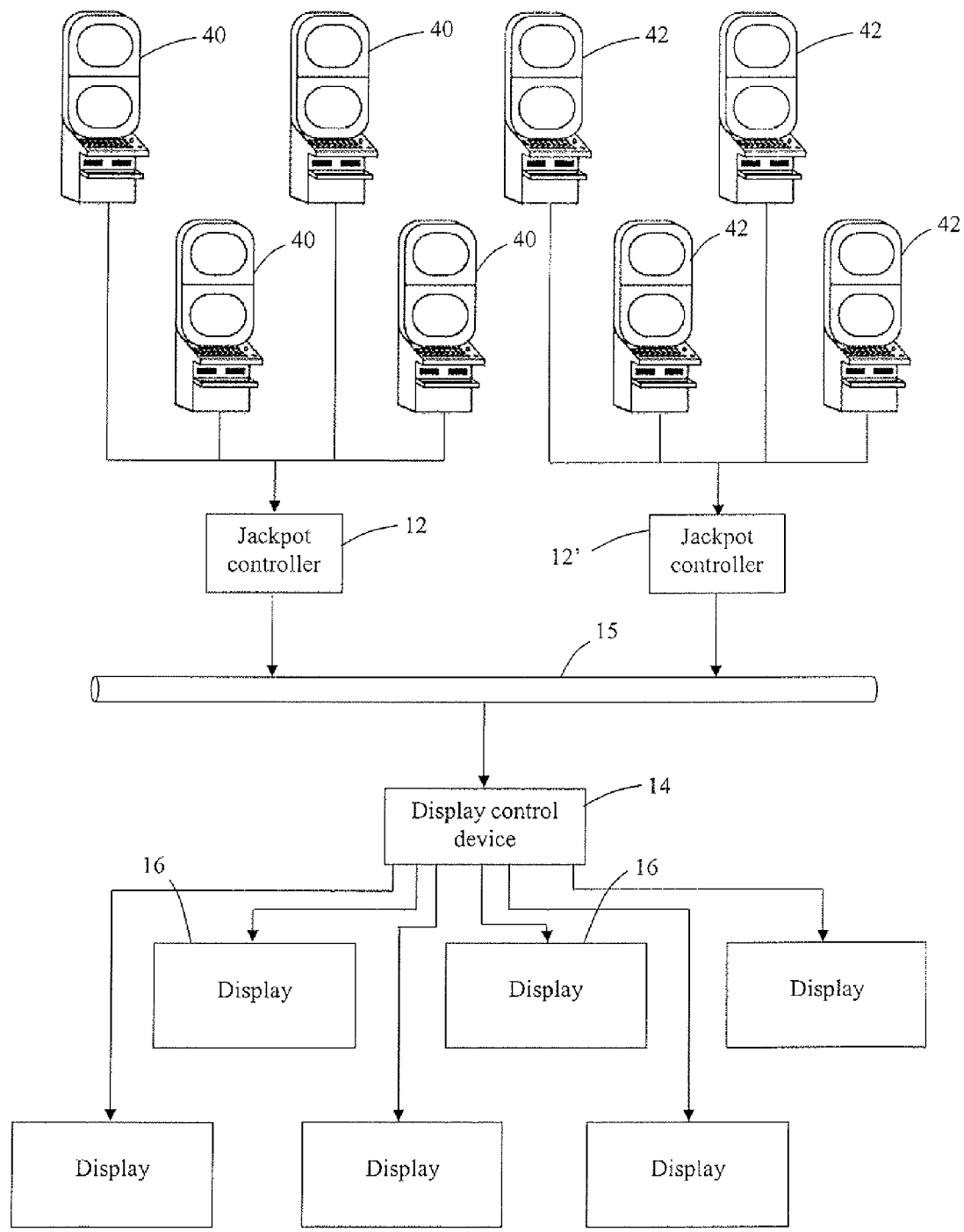
FIG. 5 is a schematic diagram illustrating an example implementation of the jackpot display system shown in FIG. 1.

In an example implementation shown in FIG. 5, four first gaming machines 40 are shown connected to a first jackpot controller 12 and four second gaming machines 42 are shown connected to a second jackpot controller 12'. Additional jackpot controllers and associated gaming machines may also be present although for clarity purposes these are not shown.

Operation is such that each gaming machine 40, 42 supplies jackpot contribution data indicative of a jackpot contribution amount to a respective jackpot controller 12, 12' and the respective jackpot controllers 12, 12' use the supplied jackpot contribution data to generate jackpot data indicative of a current jackpot amount which may be won by a player of a gaming machine 22,24 associated with the jackpot controllers 12,12'.

The jackpot controllers 12,12' supply jackpot data indicative of the respective jackpot amounts to the display control device 14 through the jackpot network 15 and the display control device 14 processes the jackpot data according to any desired scheme and supplies display data to each display 16 to cause each display 16 to show one of the jackpot amounts. For example, each display 16 may be caused to display a different jackpot amount, to display the available jackpot amounts in sequence, or the displays 16 may be arranged caused to randomly display a jackpot amount.

In the present embodiments, each display 16 is in the form of an LCD display, although it will be understood that any display device is envisaged, such as plasma screens and projectors.

Figure 6:
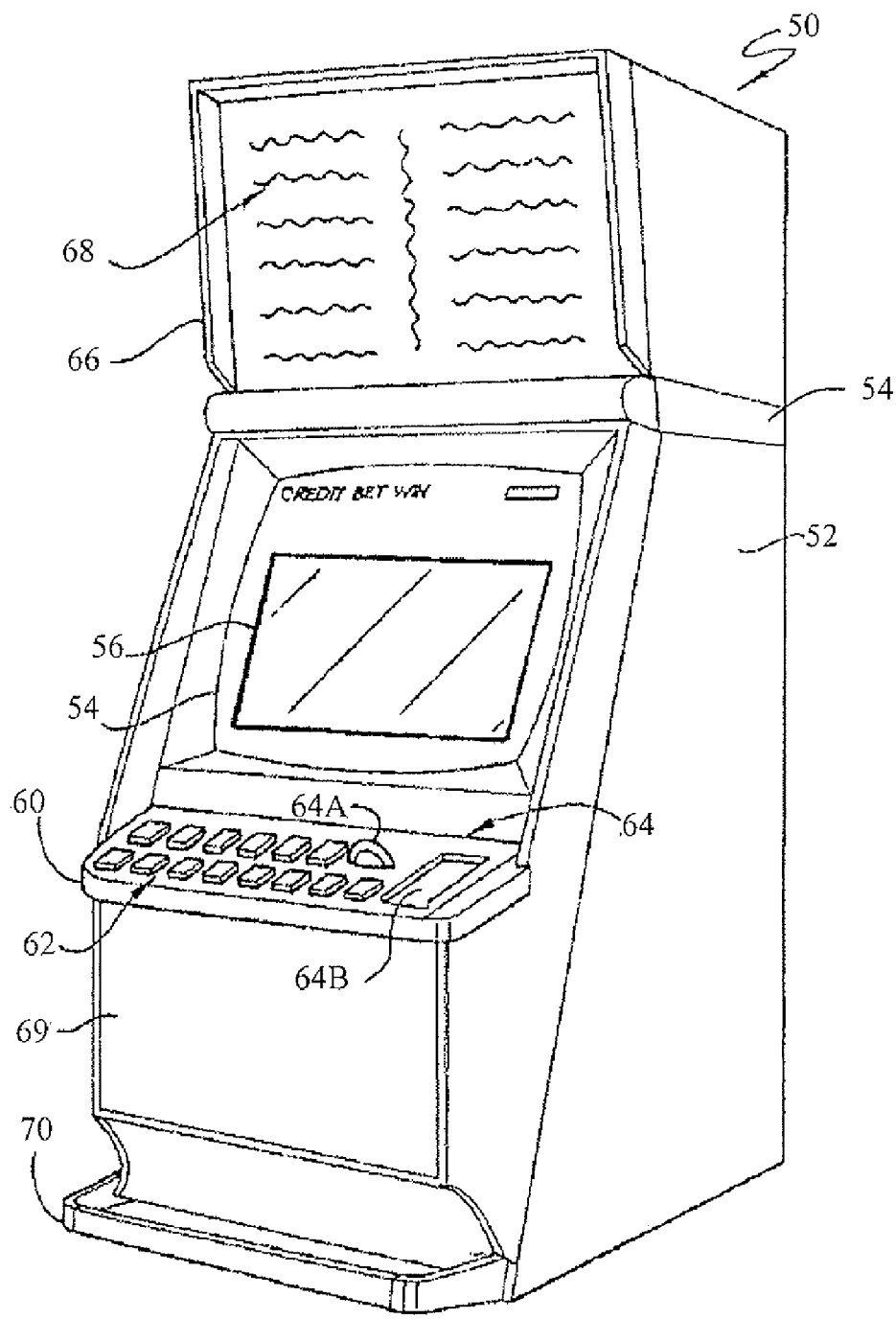
FIG. 6 is a diagrammatic representation of a gaming machine suitable for use with the jackpot display system shown in FIG. 1.

An example gaming machine 50 is illustrated in FIG. 6. The gaming machine 50 includes a console 52 incorporating a Player Marketing Module 54 and has a display 56 on which is displayed representations of a game 58 that can be played by a player. A mid-trim 60 of the gaming machine 12 houses a bank of buttons 62 for enabling a player to interact with the gaming machine, in particular during gameplay. The mid-trim 60 also houses a credit input mechanism 64 which in this example includes a coin input chute 64A and a bill collector 64B. Other credit input mechanisms may also be employed, for example, a card reader for reading a smart card, debit card or credit card. The PMM 54 may include a reading device (not shown) for the purpose of reading a player tracking device, for example as part of a loyalty program. The player tracking device may be in the form of a card, flash drive or any other portable storage medium capable of being read by the reading device. In this example, the PMM 54 is a Sentinel III device produced by Aristocrat Technologies Pty Ltd.

A top box 66 may carry artwork 68, including for example pay tables and details of bonus awards and other information or images relating to the game. Further artwork and/or information may be provided on a front panel 69 of the console 52.

A coin tray 70 is mounted beneath the front panel 69 for dispensing cash payouts from the gaming machine 40.

The display 54 is in the form of a video display unit, particularly a cathode ray tube screen device. Alternatively, the display 54 may be a liquid crystal display, plasma screen, or any other suitable video display unit. The top box 66 may also include a display, for example a video display unit, which may be of the same type as the display 54, or of a different type.

The display 54 in this example is arranged to display representations of several reels, each reel of which has several associated symbols. Typically 3, 4 or 5 reels are provided. During operation of the game, the reels first appear to rotate then stop with typically three symbols visible on each reel. Game outcomes are determined on the basis of the visible symbols together with any special functions associated with the symbols, and if a function has been allocated to a reel, on the basis of the allocated function.

As indicated in FIG. 1, the jackpot display system 10 may be arranged so that the display controller 14 is capable of receiving video information, for example from an AV source 80. The AV source 80 may supply advertising information for display on one or more of the displays 16 under control of the display controller 14, or may supply video information, for example corresponding to sporting events.

In some situations, the display controller 14 may be required to decode multiple streams of video data simultaneously. In order to reduce the processing load on the display control device 14, multiple sets of video data may be provided for each jackpot sequence, each set of video data being optimised to a particular size of display output. Video data optimised to display at a small size has less image quality, and requires less processing power to decode and display, and as a result more video data sets can be decoded simultaneously. The display controller 14 may be arranged to automatically select the optimum video data set based on quality and processing requirements.

It will be appreciated that the jackpot display system may also be arranged so as to display an image, such as a jackpot amount, over more than one display by providing each display controller with a selected segment of the image to be displayed. With this arrangement, synchronization of the images segments across the display controllers would be required.

Modifications and variations as would be apparent to a skilled addressee are deemed to be within the scope of the present invention.

The invention claimed is:

1. A jackpot display system for a gaming system, the jackpot display system comprising:
    a display control device arranged to receive jackpot data indicative of a plurality of current jackpot amounts, each jackpot amount being derived from games played on at least one gaming machine;
    a plurality of displays in communication with the display control device; and
    wherein, when a number of jackpot amounts exceeds a number of displays, the display control device is arranged to selectively modify the number of jackpot amounts that are shown on the associated displays, and wherein, when the number of displays exceeds the number of jackpot amounts, the display controller is arranged to selectively display one or more of the jackpot amounts on more than one display.

2. A jackpot display system as claimed in claim 1, wherein the control device is arranged to associate at least some of the displays with jackpot amounts so that a plurality of jackpot amounts are consecutively displayed on at least one of the displays.

3. A jackpot display system as claimed in claim 2, wherein the consecutively displayed jackpot amounts are displayed in a specific order.

4. A jackpot display system as claimed in claim 2, wherein the consecutively displayed jackpot amounts are displayed in highest to lowest jackpot amount order.

5. A jackpot display system as claimed in claim 2, wherein the consecutively displayed jackpot amounts are displayed pseudo randomly.

6. A jackpot display system as claimed in claim 1, wherein the display control device is arranged to associate at least some of the displays with jackpot amounts so that at least one displayed jackpot amount is emphasised relative to other displayed jackpot amounts.

7. A jackpot display system as claimed in claim 6, wherein the system is arranged such that a displayed jackpot amount is emphasised when the jackpot amount has been won by a player of a gaming machine.

8. A jackpot display system as claimed in claim 7, wherein the system is arranged such that a displayed jackpot amount is emphasised when the jackpot amount has been won by displaying only the jackpot amount which has been won.

9. A jackpot display system as claimed in claim 7, wherein the system is arranged such that a displayed jackpot amount is emphasised when the jackpot amount has been won by displaying the jackpot amount at an increased size relative to other displayed jackpot amounts.

10. A jackpot display system as claimed in claim 1, wherein the display control device comprises a display controller arranged to receive jackpot data indicative of a plurality of jackpots, and to generate display data usable by the displays to display at least one jackpot amount.

11. A jackpot display system as claimed in claim 1, wherein the display control device comprises a master display controller and a plurality of slave display controllers under control of the master display controller.

12. A jackpot display system as claimed in claim 1, wherein the display control device comprises a multiplexer arranged to selectively connect each of at least some of the displays to jackpot data indicative of a jackpot amount.

13. A jackpot display system as claimed in claim 1, wherein each jackpot amount has an associated display controller arranged to generate display data usable by a display to display a jackpot amount.

14. A jackpot display system as claimed in claim 13, wherein the multiplexer is arranged to selectively direct display data from the display controllers to the displays.

15. A jackpot display system as claimed in claim 13, wherein the multiplexer is arranged to selectively direct jackpot data to the display controllers.

16. A jackpot display system as claimed in claim 1, wherein the jackpot display system is arranged to apply video effects to the displayed jackpot amounts.

17. A jackpot display system as claimed in claim 1, further comprising at least one jackpot controller, each jackpot controller being arranged to receive jackpot contribution data from a plurality of gaming machines associated with the jackpot controller, and each jackpot controller being arranged to generate jackpot data indicative of a jackpot amount for supply to the display control device.

18. A jackpot display system as claimed in claim 1, wherein the jackpot display system is arranged to receive video data for selective display on at least one of the displays at the same time as or intermittently with the jackpot amounts.

19. A jackpot display system as claimed in claim 1, wherein the jackpot display system is arranged to store multiple sets of video data for each jackpot amount to be displayed, each set of video data being optimised to a particular display size, and the jackpot display system being arranged to select one of the video data sets depending on the size at which the jackpot amount is to be displayed.

20. A method of displaying a jackpot, the method comprising:
   receiving jackpot data indicative of a plurality of current jackpot amounts, each jackpot amount being derived from games played on at least one gaming machine; and
   providing a plurality of displays in communication with a display control device;
   selectively modifying the number of jackpot amounts shown on respective displays when the number of jackpot amounts exceeds the number of displays; and
   selectively displaying one or more of the jackpot amounts on more than one of said plurality of displays when the number of the plurality of displays exceeds the number of jackpot amounts.

21. A method as claimed in claim 20, comprising associating at least some of the displays with jackpot amounts so that a plurality jackpot amounts are simultaneously displayed on a plurality of displays.

22. A method as claimed in claim 20, comprising associating at least some of the displays with jackpot amounts so that a plurality of jackpot amounts are consecutively displayed on at least one of the displays.

23. A method as claimed in claim 22, comprising displaying the consecutively displayed jackpot amounts in a specific order.

24. A method as claimed in claim 22, comprising displaying the consecutively displayed jackpot amounts in highest to lowest jackpot amount order.

25. A method as claimed in claim 22, comprising displaying the consecutively displayed jackpot amounts pseudo randomly.

26. A method as claimed in claim 20, comprising emphasising at least one displayed jackpot amount relative to other displayed jackpot amounts.

27. A method as claimed in claim 26, comprising emphasising a displayed jackpot amount when the jackpot amount has been won by a player of a gaming machine.

28. A method as claimed in claim 27, comprising emphasising a displayed jackpot amount when the jackpot amount has been won by displaying only the jackpot amount which has been won.

29. A method as claimed in claim 27, comprising emphasising a displayed jackpot amount when the jackpot amount has been won by displaying at an increased size relative to other displayed jackpot amounts.

30. A method as claimed in claim 20, comprising providing a display controller arranged to receive jackpot data indicative of a plurality of jackpots, and generating display data usable by the displays to display at least one jackpot amount.

31. A method as claimed in claim 20, comprising providing a master display controller and a plurality of slave display controllers under control of the master display controller.

32. A method as claimed in claim 20, comprising providing a multiplexer arranged to selectively connect each of at least some of the displays to information indicative of a jackpot amount.

33. A method as claimed in claim 20, comprising providing each jackpot amount with an associated display controller arranged to generate display data usable by a display to display a jackpot amount.

34. A method as claimed in claim 33, comprising arranging the multiplexer to selectively direct display data from the display controllers to the displays.

35. A method as claimed in claim 33, comprising arranging the multiplexer to selectively direct jackpot data to the display controllers.

36. A method as claimed in claim 20, comprising applying video effects to the displayed jackpot amounts.

37. A method as claimed in claim 20, comprising receiving jackpot contribution data from a plurality of gaming machines associated with each jackpot controller, and generating jackpot data indicative of a jackpot amount for supply to the display control device.

38. A method as claimed in claim 20, comprising receiving video data for selective display on at least one of the displays at the same time as or intermittently with the jackpot amounts.

39. A method as claimed in claim 20, comprising storing multiple sets of video data for each jackpot amount to be displayed, each set of video data being optimised to a particular display size, and selecting one of the video data sets depending on the size at which the jackpot amount is to be displayed.

* * * * *